United States Patent [19]

Kobylarz

[11] Patent Number: 4,476,617

[45] Date of Patent: Oct. 16, 1984

[54] BEARING INSTALLATION TOOL

[75] Inventor: Thomas L. Kobylarz, Burlington, Conn.

[73] Assignee: The Spencer Turbine Company, Windsor, Conn.

[21] Appl. No.: 394,826

[22] Filed: Jul. 2, 1982

[51] Int. Cl.[3] .............. B23P 19/04

[52] U.S. Cl. .............. 29/264

[58] Field of Search .............. 29/256, 258-260, 29/263-266

[56] References Cited

U.S. PATENT DOCUMENTS

| | | | |
|---|---|---|---|
| 1,468,777 | 9/1923 | Edwards | 29/263 |
| 2,068,021 | 1/1937 | Hamman | 29/263 |
| 2,562,419 | 7/1951 | Ferris | 29/264 |
| 3,007,241 | 11/1961 | Gonzalez | 29/266 |
| 3,123,901 | 3/1964 | Traugott | 29/263 |
| 4,285,111 | 8/1981 | Dubach | 29/263 |

*Primary Examiner*—Robert C. Watson
*Attorney, Agent, or Firm*—McCormick, Paulding & Huber

[57] ABSTRACT

A tool for pressing a bearing onto a shaft includes a threaded rod for connection to the shaft and an elongated tubular presser member coaxially received on the rod. A nut threaded on the free end of the rod is rotated to move the presser member in pressing engagement with a bearing to be seated on the shaft. A presser bearing assembly received on the free end of the shaft between the nut and the presser member enables the nut to turn freely on the rod and relative to other parts of the installation tool and the shaft. A plurality of presser plates adapt the tool for use in installing bearings in a wide range of sizes.

8 Claims, 6 Drawing Figures

BEARING INSTALLATION TOOL

BACKGROUND OF THE INVENTION

This invention relates in general to hand tools and deals more particularly with an improved bearing installation tool for pressing a bearing onto an end portion of a shaft which has a threaded central opening in its end. In pressing a bearing onto a shaft, the bearing must be maintained in accurate coaxial alignment with the shaft while uniform pressure is applied in an axial direction to a radial face of the inner ring of the bearing. Slight misalignment of the bearing relative to the shaft during assembly may result in damage to the bearing and/or the shaft. Heretofore, it has been common practice to use a piece of tubing to drive the inner ring of a bearing onto a cylindrical shaft seat. However, the use of such an improvised tool can result in bearing misalignment or accidental damage to the bearing and/or the shaft seat. Further, where the installation tool is of a type which has a threaded member for threadably engaging a tapped opening in the shaft and a nut engaged with the threaded member for applying pressure to the bearing, it may be necessary to secure the shaft against rotation while pressure is being applied to the bearing by the tool, because rotation of the nut tends to cause corresponding rotation of the shaft.

It may not be feasible to secure the shaft against rotation, as, for example, where only the end portion of the shaft upon which the bearing is being installed is inaccessible. A further problem may be encountered where the shaft end portion, which defines the bearing seat, is relatively inaccessible as, for example, where it is located deep within a closely surrounding housing.

It is the general aim of the present invention to provide an improved bearing installation tool which may be used to install a bearing on a relatively inaccessible shaft end portion and which does not require that the shaft to be secured against rotation by means other than the bearing installation tool. A further aim of the invention is to provide an improved bearing installation tool which may be readily adapted to install bearings in a wide range of sizes.

SUMMARY OF THE INVENTION

In accordance with the present invention an improved tool is provided for installing a bearing on a cylindrical seat defined by an end portion of a shaft which has a threaded central opening in its end. The tool generally comprises a presser assembly which includes at least one presser member and which has a bore extending through it, means defining at least one coaxial presser surface on the presser assembly for pressing engagement with a radially disposed face of an associated bearing to be installed, and attaching and pressing means for securing the presser assembly to the shaft with the one presser surface engaged with the face of the bearing and moving the presser assembly in an axial direction relative to the shaft to move the one presser surface in the direction of the bearing. The attaching and pressing means includes a threaded member for threadably engaging the shaft within its tapped opening and which extends through the presser assembly bore and a nut threadably engaged with the threaded member. The tool further includes presser bearing means received on the threaded member between the nut and the presser assembly for enabling the nut to freely rotate relative to the shaft and the threaded member as it is threaded onto the threaded member and in the direction of the bearing to move the presser assembly in pressing engagement with the bearing and apply pressing force to the bearing to seat it on the shaft.

DETAILED DESCRIPTION OF PREFERRED EMBODIMENT

Figures 1, 2, 3, 4, 5, 6:
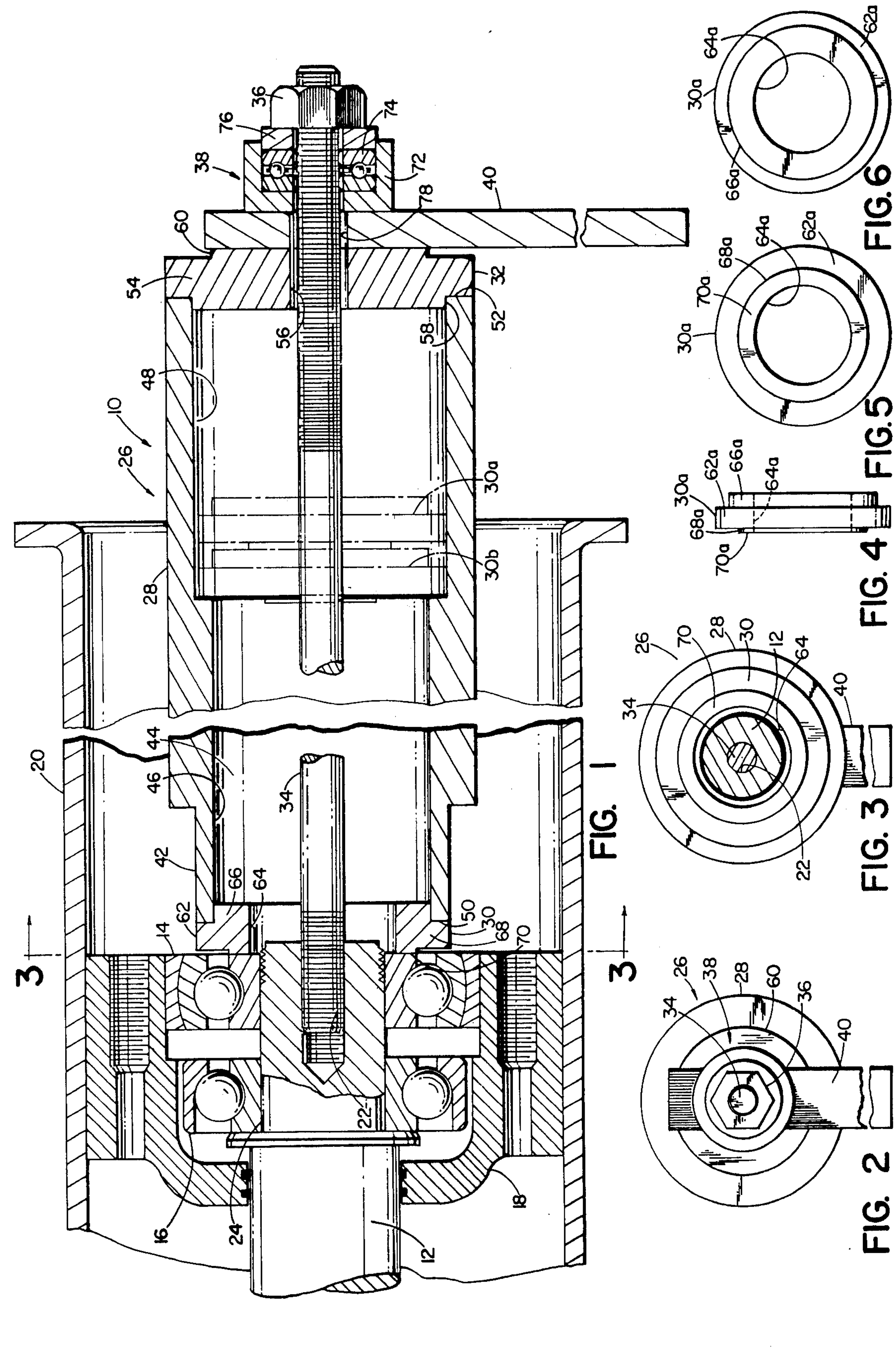
FIG. 1 is an axial sectional view through a bearing installation tool embodying the present invention and shown in pressing relation to a shaft and in pressing relation to a bearing being pressed onto the shaft.
FIG. 2 is a somewhat reduced right end elevational view of the bearing installation tool shown in FIG. 1.
FIG. 3 is a somewhat reduced sectional view taken along the line 3—3 of FIG. 1.
FIG. 4 is a somewhat reduced side elevational view of a typical presser plate.
FIG. 5 is a left end elevational view of the presser plate shown in FIG. 4.
FIG. 6 is a right end elevational view of the presser plate shown in FIG. 4.

In accordance with the broad concept of the invention, a bearing installation tool for pressing a bearing onto a cylindrical seat defined by an end portion of a shaft comprises a presser assembly which includes at least one presser member adapted to engage and bear evenly against a radial face of the bearing to be installed. A threaded member, threadably engaged in a central opening in the end of the shaft, and an associated nut, which hold the presser assembly in connected relation with the shaft and in operable relation to the bearing, coact to apply pressing force to the bearing when the nut is rotated relative to the threaded member to advance it axially along the member and in the direction of the bearing. A presser bearing assembly received on the threaded member cooperates with the nut and the presser assembly to enable the nut to turn freely relative to the presser assembly, so that the presser assembly may be held in fixed angular position to restrain the shaft and the threaded member connected to it against rotation as the nut is rotated on and relative to the threaded member. The tool may include a handle for use in holding the presser assembly in fixed angular position, as will be hereinafter more fully discussed.

Turning now to the drawing, and referring first particularly to FIG. 1, a bearing installation tool embodying the present invention is indicated generally by the reference numeral 10. The tool 10 is shown attached to an end portion of a shaft 12 and in pressing relation to a bearing 14, which comprises part of a bearing assembly. The bearing assembly further includes another bearing 16 and a bearing housing 18 which is mounted in a relatively inaccessible position within another housing 20 which may, for example, comprise a part of an associated machine. The shaft 12 has a tapped central opening 22 in its end, which is used to secure the tool 10, and defines a cylindrical seating surface 24, all of which whill be hereinafter more fully discussed.

The illustrated tool 10 generally comprises a presser assembly, indicated generally at 26, which includes a presser member or body 28, another presser member or presser plate 30, supported at the front end of the presser body, and a pusher plate 32 mounted at the other end of the presser body. An axially elongated member or rod 34 threaded at both ends and a nut 36 threadably engaged with one end portion of the rod coact to secure the tool 10 to the shaft 12 in pressing relation to an associated bearing to be installed and to apply pressing force to the presser assembly 26 to move the presser assembly in pressing engagement with the bearing. A presser bearing assembly, indicated generally at 38, is received on the rod 34 between the presser assembly 26 and the nut 36, substantially as shown. The illustrated tool 10 further includes a handle 40 which is received on the rod 34 between the bearing assembly 38 and the presser assembly 26, for a purpose which will be hereinafter more fully discussed.

Considering now the tool 10 in further detail, the presser body 28 comprises a generally cylindrical tubular member and has a reduced diameter portion 42 at one end, which is designated as the forward end of the tool for convenience in the further description which follows. A stepped cylindrical bore 44 extends coaxially through the presser body 28 and has a forward portion 46 and a rear portion 48 which has a diameter somewhat larger than the diameter of the forward portion. Preferably, and as shown, the diameter of the bore portion 48 is slightly larger than the outside diameter of the forward end portion 42. At its forward end the presser body 28 has a radially disposed and forwardly facing annular presser surface 50. A similar rearwardly facing annular presser surface 52 of somewhat larger diameter is defined by the rear end of the presser body 28.

The pusher plate 32 is preferably arranged for mounting on either end of the presser body 28 and comprises a stepped cylindrical member which has a central part, indicated by the numeral 54, and a coaxial bore 56 for receiving the rod 34 therethrough. In the drawing, the pusher plate 32 is shown mounted on the rear end of the presser body 28. A reduced diameter portion of the pusher plate, indicated at 58, projects in a forward direction from the central part 54 and is received within and complements an associated part of the rear bore portion 48 to maintain the pusher plate 32 in coaxial alignment with the presser body 28. A similar reduced portion of somewhat smaller diameter, indicated by the numeral 60, projects in a rearward direction from the central part 54 and is adapted to be received within and generally complement an associated part of the forward bore portion 46 when the pusher plate 32 is mounted on the opposite end of the presser body 28, for a purpose which will be hereinafter further evident.

The presser plate 30 comprises a stepped cylindrical plate and includes a central part 62 which has a diameter substantially equal to the diameter of the forward end portion of the presser body 28. A bore 64 extends coaxially through the presser member 30 and has a diameter at least slightly larger than the inside diameter of the inner ring of the bearing 14. A diametrically reduced portion 66 projects rearwardly from the central portion 62 and is adapted to substantially complement associated portion of the forward end of the bore 44 to maintain the presser member 30 in coaxial alignment with the presser body 28. An annular portion of reduced diameter, indicated by the numeral 68, projects forwardly from the central portion 62 to define a forwardly facing annular presser surface 70 which has an outside diameter not greater than the inside diameter of the outer ring of the bearing 14.

The illustrated presser bearing assembly 38 includes a cup-shaped bearing housing 72, a thrust bearing 74 received within the bearing housing 72, and a thrust washer 76, which bears against the thrust bearing and provides a closure for the bearing housing 72. The handle 40 is formed from a rod of generally rectangular cross section and has a cylindrical hole 78 near one end which receives the rod 34 therethrough.

Referring again to FIG. 1, the bearing 14 comprises a self-aligning spherical bearing adapted for sliding fit within the illustrated bearing housing 18. The thrust bearing 16, as shown, is shown mounted on the shaft 12 in seating engagement with a shoulder defined by a thrust washer 17 received on the shaft 12, having been previously pressed onto the shaft using the tool 10. Preparatory to installing the bearing 14 on the shaft, one end of the rod 34 is threaded into the tapped opening 22. The bearing 14 is next positioned on the free end portion of the shaft 12 in general coaxial alignment with the shaft. The presser assembly 26 which includes the presser body 28, the presser plate 30 and the pusher plate 32 is next assembled on the rod 34, substantially as shown. The handle 40 is then positioned on the rod generally adjacent the pusher plate 32, after which the bearing assembly 38 is positioned on the rod. When the presser assembly 26, the handle 40 and the bearing assembly 38 are properly positioned on the rod, the nut 36 is threaded onto the projecting end of the rod and brought into engagement with the thrust washer 76. At this point, alignment of the bearing 14 and the bearing installation tool 10 with the shaft 12 should be carefully checked. When proper coaxial alignment has been attained, the bearing 14 may be driven onto the seating surface 24 by tightening the nut 36 with a wrench or the like to apply pressing force to the bearing to move it onto and along the seating surface 24. Initial tightening of the nut 36 brings the handle 30 into frictional engagement with the rear surface of the pusher plate 32. Thereafter, the handle 40 may be held to maintain the presser assembly 26, the rod 34 and the shaft 12 in a substantially fixed angular position while the nut 36 is rotated with the thrust washer 76 and relative to the presser bearing assembly housing 72. Frictional engagement between the various parts of the tool 10 and between the tool and the inner ring of the bearing 14 is generally sufficient to prevent angular movement of the shaft 12 while the nut 36 is threaded along the rod 34 to drive the bearing 14 onto the seating surface 24. The presser bearing assembly 38 enables the nut 38 to turn freely on the threaded rod 34 and relative to other parts of the installation tool and the shaft 12 so that bearing 14 may be driven onto the seating surface 24 without necessity for securing the shaft 12 in fixed position by means other than the installation tool 10 itself. When the bearing 14 is properly seated on the shaft 12 adjacent the thrust bearing 16 the tool 10 may be removed from its attached position by first loosening the nut 36 and thereafter threading the rod 34 out of engagement with the shaft 12. The installation is then completed by applying a lock nut and lock washer (not shown) to the end of the shaft 12 and securing a thrust cap (not shown) in position on the bearing housing.

As previously noted, the installation tool 10 is adapted to drive bearings in a wide range of sizes and for this reason the tool 10 includes a plurality of pusher plates similar to the pusher plate 30 but of differing sizes. A typical pusher of another size is indicated at 30*a* in FIGS. 4–6. The outside diameter of the presser plate 30*a* is substantially equal to the outside diameter of the presser body 28 at its forward end. The outside diameter of the presser plate rearwardly projecting portion 66 is substantially equal to the diameter of the forward end portion of the bore 44. However, the diameter of the presser plate bore 64*a* and the outside diameter of the forwardly projecting portion 68*a* are sized to match the outside diameter of the inner ring and the inside diameter of the outer ring of an associated bearing.

The presser plates which comprise the assembly are sized to be received and stored within the bore rear portion 48 as shown in FIG. 1 wherein presser plates, shown in broken lines and indicated at 30*a* and 30*b*, are shown in storage position within the bore.

As previously stated, the presser body 28 also comprises a presser member. More specifically, the annular presser surface 50 at the forward end of the body is sized for direct engagement with the inner ring of another bearing which is substantially larger than the bearing 14. Thus, when the presser plate 30 is removed from assembly with the presser body 28 the forward end portion of the presser body may be utilized to press a bearing of an associated size. Further, the body member 28 may be assembled on the rod 34 in a reverse position so that the annular presser surface 52 may be positioned in pressing engagement with the inner ring of still another bearing of an associated size.

Due to the axial length of the presser assembly 26, the tool 10 may be utilized to press fit a bearing located in a relatively inaccessible position within an outer housing, such as the housing 20 illustrated in FIG. 1.

I claim:

1. A tool for installing a shaft bearing on an end portion of an axially elongated shaft having a tapped central opening in its end, said tool comprising an axially elongated tubular presser member having a first bore therethrough, a presser plate member having an outside diameter not greater than the inside diameter of an associated portion of said first bore, said presser plate member having a mounted position wherein it is engaged with one end of said presser member and a storage position wherein it is contained within said associated portion of said first bore, and a coaxial presser surface defined by one of the members including said presser member and said presser plate member for pressing engagement with a shaft bearing to be installed, and attaching and operating means for securing at least said presser member to the shaft with said presser surface engaged with the shaft bearing and moving said presser member in axial direction relative to the shaft to move said presser surface in the direction of the shaft bearing, said attaching and operating means including a threaded member extending through said first bore for threadably engaging the shaft within the tapped opening, a nut threadably engaged with said threaded member, means for maintaining said presser member in coaxial alignment with said threaded member including a pusher plate engaged with the other end of said presser member opposite said one end and having a second bore receiving the extending portion of said threaded member therethrough, positioning means on said pusher plate and extending into and substantially complementing the other end portion of said first bore for maintaining said pusher plate in alignment with said presser member with said second bore coaxially aligned with said first bore, and bearing means received on said threaded member between said nut and said pusher plate for enabling threadable rotation of said nut on said threaded member and relative to said pusher plate and said presser member.

2. A tool for installing a shaft bearing on an end portion of an axially elongated shaft having a tapped central opening in its end, said tool comprising a generally cylindrical tubular presser member having a reduced diameter portion at one end and a generally cylindrical first bore extending coaxially therethrough, said first bore having one portion terminating at said one end and another portion of somewhat larger diameter than said one portion terminating at said other end, said presser member having an annular radially disposed first presser surface at said one end and an annular radially disposed second presser surface of somewhat larger diameter than said first presser surface at said other end, a stepped cylindrical pusher plate having a coaxial second bore therethrough for selective mounting on either end of said presser member and mounted on an associated end of said presser member, said pusher plate having a cylindrical central portion and one coaxial generally cylindrical portion of reduced diameter projecting from one end of said central portion and having a diameter substantially equal to the diameter of said one end portion of said first bore, said pusher plate having another coaxial cylindrical portion of reduced diameter projecting from the other end of said central portion and having a diameter substantially equal to said other end portion of said first bore, a threaded member extending through said first and second bores for threadably engaging the shaft within its tapped opening, a nut threadably engaged with said threaded member, and bearing means received on said threaded member between said pusher plate and said nut for enabling threadable rotation of said nut on said threaded member and relative to said pusher plate and said presser member.

3. A tool for installing a shaft bearing as set forth in claim 2 including a stepped cylindrical presser plate having a coaxial third bore therethrough and mounted on the end of said presser member opposite said associated end, said presser plate defining an annular radially disposed third presser surface differing in size from said first and second presser surfaces, and means for maintaining said presser plate in alignment with said presser member and said pusher plate with said third bore in generally coaxial alignment with said first bore and said second bore.

4. A tool for installing a bearing as set forth in claim 3 wherein said means for maintaining said presser plate comprises a portion of said presser plate received within and complementing an associated end portion of said first bore.

5. A tool for installing a shaft bearing as set forth in claim 3 wherein said presser plate has an outside diameter not greater than the inside diameter of an associated portion of said first bore and said presser plate is received in a storage position with said associated portion of said first bore.

6. A tool for installing a shaft bearing as set forth in claim 1 wherein said presser plate comprises a generally cylindrical plate having a third bore extending coaxially therethrough and said presser assembly includes means for maintaining said presser plate in coaxial alignment with said presser member.

7. A tool for installing a shaft bearing as set forth in either claim 1 or claim 2 including means for holding said presser member in fixed angular position relative to the shaft bearing.

8. A tool for installing a shaft bearing as set forth in claim 7 wherein said holding means comprises a handle received on said threaded member between said bearing means and said pusher plate and maintained in frictional engagement with said pusher plate by said threaded rod and said nut.

* * * * *